United States Patent
Kuehner et al.

(10) Patent No.: US 11,760,246 B2
(45) Date of Patent: Sep. 19, 2023

(54) SYSTEMS AND METHODS FOR IMPROVING THE ADJUSTMENT OF A VEHICLE HEADREST

(71) Applicant: TOYOTA RESEARCH INSTITUTE, INC., Los Altos, CA (US)

(72) Inventors: Manuel Ludwig Kuehner, Mountain View, CA (US); Daniel J. Brooks, Arlington, MA (US); Hiroshi Yasuda, San Francisco, CA (US); Jaime Camhi, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

(21) Appl. No.: 17/575,376

(22) Filed: Jan. 13, 2022

(65) Prior Publication Data

US 2023/0219475 A1    Jul. 13, 2023

(51) Int. Cl.
*B60N 2/02* (2006.01)
*B60N 2/16* (2006.01)
*B60N 2/22* (2006.01)
*B60N 2/10* (2006.01)
*B60N 2/815* (2018.01)
*B60N 2/829* (2018.01)

(52) U.S. Cl.
CPC ............ *B60N 2/815* (2018.02); *B60N 2/829* (2018.02)

(58) Field of Classification Search
CPC . A47C 7/38; B60N 2/80; B60N 2/806; B60N 2/888; B60N 2/002; B60N 2/829; B60N 2/0232; B60N 2/20; B60N 2/4228; B60R 2021/0048
See application file for complete search history.

(56) References Cited

U.S. PATENT DOCUMENTS

| | | |
|---|---|---|
| 5,918,940 A | 7/1999 | Wakamatsu |
| 6,402,195 B1 | 6/2002 | Eisenmann |
| 7,367,626 B2 | 5/2008 | Lawall |

(Continued)

FOREIGN PATENT DOCUMENTS

| | | |
|---|---|---|
| CN | 108860026 | 11/2018 |
| CN | 109367440 | 2/2019 |
| JP | 2013169907 | 9/2013 |

*Primary Examiner* — Shin H Kim
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for improved and intuitive adjustment of a vehicle headrest. A vehicle headrest adjustment system may include touch sensors and/or motion sensors to determine a driver or passenger intends to adjust a vehicle headrest. Upon detection of touch consistent with intent to adjust a vehicle headrest and/or a hand gesture consistent with intent to adjust a vehicle headrest, a system may unlock a vehicle headrest. A driver or passenger may move the unlocked vehicle headrest into the desired position. Upon detection of a condition indicating the driver or passenger is finished and/or upon a set period of time elapsing, the system may re-lock the vehicle headrest into place. A vehicle headrest adjustment system may also include a power-assist function. The power-assist function may include motors and force sensors to assist a driver or passenger in moving a vehicle headrest into a desired position.

11 Claims, 5 Drawing Sheets

(56) References Cited

U.S. PATENT DOCUMENTS

| | | | |
|---|---|---|---|
| 7,588,115 B2 | 9/2009 | Breed | |
| 7,614,690 B2 | 11/2009 | Matsubayashi | |
| 7,618,091 B2 | 11/2009 | Akaike | |
| 7,640,090 B2 | 12/2009 | Uchida | |
| 8,061,777 B2 | 11/2011 | Jensen | |
| 8,408,645 B2 | 4/2013 | Alexander | |
| 9,145,078 B2 | 9/2015 | Locke | |
| 9,434,276 B2 | 9/2016 | Yetukuri | |
| 10,029,585 B2 * | 7/2018 | Frye | B60N 2/0296 |
| 10,252,641 B2 * | 4/2019 | Kim | B60R 16/037 |
| 2006/0186713 A1 * | 8/2006 | Breed | B60N 2/865 |
| | | | 297/216.12 |
| 2007/0235297 A1 * | 10/2007 | Stoschek | B60N 2/0228 |
| | | | 200/5 R |
| 2017/0166089 A1 * | 6/2017 | Frye | B60N 2/08 |
| 2017/0327016 A1 * | 11/2017 | Worlitz | B60N 2/0228 |
| 2018/0056816 A1 * | 3/2018 | Kim | B60R 16/037 |
| 2021/0380022 A1 * | 12/2021 | Kanitz | B60N 2/01 |
| 2022/0234540 A1 * | 7/2022 | Barnes | B60R 22/48 |
| 2022/0371474 A1 * | 11/2022 | Kaku | B60N 2/0228 |
| 2022/0384122 A1 * | 12/2022 | Shin | H01H 9/161 |

* cited by examiner

SYSTEMS AND METHODS FOR IMPROVING THE ADJUSTMENT OF A VEHICLE HEADREST

TECHNICAL FIELD

The present disclosure relates generally to vehicle comfort and safety controls, and in particular, some implementations may relate to improved adjustment of a vehicle headrest.

DESCRIPTION OF RELATED ART

Vehicles are equipped with headrests to improve driver and passenger safety by preventing whiplash and to improve driver and passenger comfort by supporting the head and neck of a driver or passenger. To accommodate drivers and passengers of different sizes and drivers and passengers having different comfort preferences, vehicle headrests may be adjusted. For example, vehicle headrests may be raised or lowered to increase or decrease the height of the headrest relative to the seat. Vehicle headrests may also be tilted to adjust the angle of the headrest relative to the seat.

Traditionally, drivers and/or passengers may adjust a vehicle headrest by physically depressing a button on the headrest. Depressing this button may release the headrest so that a driver may pull the headrest up or push the headrest down to a desired height. Releasing the button may lock the headrest into place such that it can no longer be adjusted. The driver or passenger may need to depress the button continuously, while adjusting the headrest, to avoid locking the headrest into place. A driver or passenger may be able to tilt a headrest by twisting or pulling a headrest forward or twisting and or pushing a headrest backward using their own physical strength provided by their arms and/or hands. A driver may need to depress a release button to tilt the headrest as well.

Release buttons are typically located on the seat back near the point where the headrest is attached to the seat, though they may be located in other places. For example, if the headrest is pushed all the way down and flush with the seat, the release button may be obscured by the headrest itself. A driver may need to reach their hand in between the headrest and the seat to locate and depress the release button. Therefore, in traditional systems, the release button can be difficult to locate. The release button can also be difficult to depress. Further, it can be difficult to depress the release button while simultaneously adjusting the headrest, which is typically required in most traditional systems. The difficulties are only complicated when a driver or passenger assumes a seated position with the back of their head against the headrest. The driver or passenger in such a position cannot see the release button or headrest and must reach their arms and/or hands behind their body and/or head and neck to adjust the headrest.

Current vehicular adjustment systems or mechanisms contemplate replacing and/or supplementing a physical release button with other interfaces to support headrest adjustment. For example, one mechanism operates by detecting the presence of a driver or passenger in a seat, and unlocking headrest adjustment mechanisms based on whether a driver or passenger is seated in a vehicle seat. Such a system may include some limitations, including the fact that this type of system may allow a driver to adjust a headrest while driving. As another example, a system may leverage sensors to adjust a headrest in a certain way based on user motions. Such a system may also be limited in that it allows a driver to adjust the headrest while driving the vehicle. Such a system, similar to the previously described system, fails to teach locking/unlocking the headrest system, thus also allowing a driver to adjust the headrest while driving the vehicle. Therefore, a system capable of unlocking and/or locking a headrest to allow for improved adjustment only at a safe and appropriate time is desired.

BRIEF SUMMARY OF THE DISCLOSURE

According to various embodiments of the disclosed technology a headrest adjustment system may include a touch sensor system. The touch sensors may be embedded in portions of a headrest. The touch sensor system may be configured to detect a user touch at portions of the headrest. A headrest adjustment system may also include a smart lock mechanism. The smart lock mechanism may secure the headrest in place. For instance, upon detection of a user touch at portions of the headrest, the adjustment system may unlock the smart lock mechanism and may release the headrest.

A touch sensor system may include capacitive touch sensors. Capacitive touch sensors may be configured to detect a user touch at portions of a headrest. A touch sensor system may also or alternatively include pressure sensors. Pressure sensors may be configured to detect a user touch at portions of the headrest.

A headrest adjustment system may also detect the absence of user touch. For instance, upon detection of the absence of a user touch for a threshold period of time, the adjustment system may lock the smart lock mechanism and may secure the headrest in place. The threshold period of time may be a set period of time following an initial release of the headrest. A headrest adjustment system may also detect the absence of a two-handed touch. For instance, the headrest adjustment system may lock the smart lock mechanism and may secure the headrest in place after the expiration of a set period of time following detection of a lock of user touch at both of two separate portions of the headrest.

Two separate portions of a headrest may be selected such that, in order for a user to touch both of the two portions at the same time, the user must touch one portions with one hand and the other portion with the other hand. In other words, the portions may be selected and configured to detect a two-handed touch.

A headrest adjustment system may also include a motion sensor system. The motion sensor system may be configured to detect hand gestures indicating that a user intends to adjust the headrest. The smart lock mechanism may be further configured to communicate with the motion sensor system. For instance, upon detection of hand gestures indicating that a user intends to adjust the headrest, the adjustment system may unlock the smart lock mechanism and may release the headrest.

A power-assist system may also aid in adjusting a headrest. A power-assist system may include force sensors. The force sensors may be configured within a headrest. A power-assist system may also include motors attached to the headrest. Upon detection by the force sensors of a user force applied to the headrest, the power-assist system may actuate the motors to move the headrest in the direction of the applied force.

In one embodiment, upon detection of a lack of user force applied to the headrest, the power-assist system may stop the motors and may stop moving the headrest. In an embodiment, the force sensors may detect a counter-force applied to the headrest. Upon detection of the counter-force, the power-assist system may stop the motors and may top moving the headrest.

In an embodiment, the motors may be configured to automatically stop moving the headrest in a downward direction when the headrest contacts a seat. In an embodiment, the motors may be configured to automatically stop moving the headrest in an upwards direction when the headrest has reached a maximum upward extension distance.

A headrest adjustment method may include detecting, using touch sensors, a simultaneous first user touch at a first portion of the headrest and a second user touch at a second portion of the headrest. A headrest adjustment method may further include confirming the detected first and second user touches indicate that the user intends to adjust the headrest. A headrest adjustment method may further include unlocking a smart mechatronic lock to enable free movement of the headrest. The smart mechatronic lock may secure the headrest in place. A headrest adjustment method may further include detecting, using force sensors, a user force applied to the headrest. A headrest adjustment method may further include moving the headrest, using motors, in the direction indicated by the applied user force.

A headrest adjustment method may further include detecting, using force sensors, the absence of a user force applied to the headrest. A headrest adjustment method may further include stopping motion of the headrest. A headrest adjustment method may further include detecting, using touch sensors, the absence of a user touch at both the first and second portions of the headrest. A headrest adjustment method may further include confirming the detected absence of user touches indicates the user is finished adjusting the headrest. A headrest adjustment method may further include locking the smart mechatronic lock to secure the headrest in place. A headrest adjustment method may further include confirming that the detected user hand gesture is consistent with safe operation of a vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
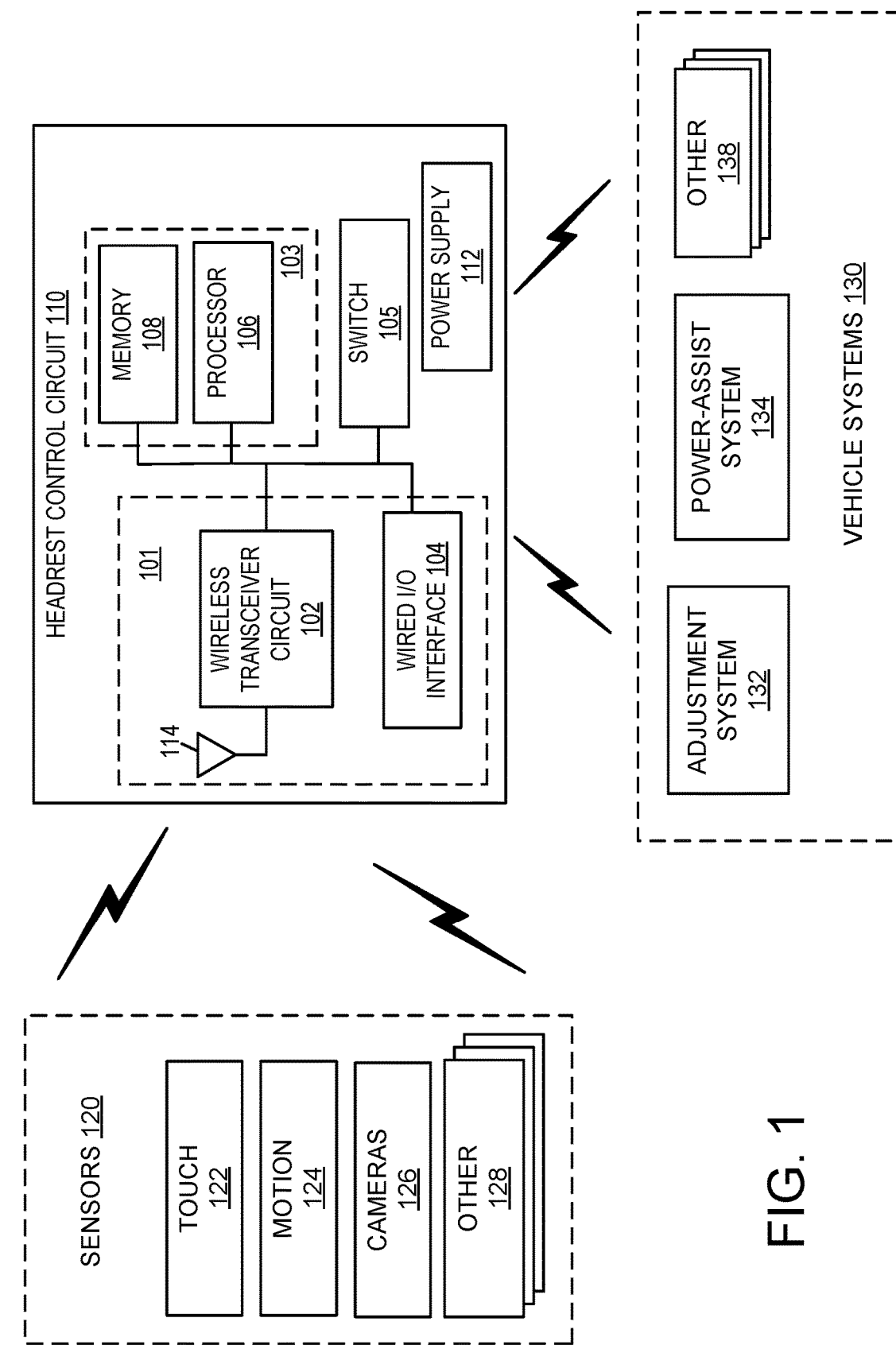
FIG. 1 illustrates an example architecture for facilitating headrest adjustment in accordance with one embodiment of the systems and methods described herein.

The figures are not exhaustive and do not limit the present disclosure to the precise form disclosed.

DETAILED DESCRIPTION

Embodiments of the systems and methods disclosed herein can provide improvements in adjusting a vehicle headrest. Vehicle headrests improve the safety of a driver and passengers in a vehicle by preventing whiplash. Vehicle headrests also improve the comfort of the driver and passengers in a vehicle by providing support for the head and/or neck. In conventional systems, a vehicle headrest may be adjusted by physically depressing a mechanical release button, and, while the button is depressed, physically pulling or pushing the headrest into the desired position. Locating and depressing the mechanical release button may be difficult and/or awkward. Because it may be difficult and/or awkward to adjust the headrest, drivers and/or passengers may not adjust the headrest or may not adjust the headrest properly. A properly adjusted headrests confers both safety and comfort advantages, so a system enabling improved and intuitive adjustment of a vehicle headrest is desired. Such a system increases the chances that a driver and/or passengers will adjust the headrest properly.

The systems and methods described herein provide for improved and intuitive vehicle headrest adjustment. Adjusting a headrest in accordance with some embodiments may be accomplished by replacing the conventional mechanical release button interface discussed above with a smart mechatronic lock-unlock interface that operates based on detected user intent. For example, a system may employ sensors and a processor with instructions to determine when a driver and/or passenger intends to adjust a vehicle headrest. Upon detecting and confirming that a driver and/or passenger intent to adjust the headrest, the system may automatically unlock the headrest to allow the driver and/or passenger to push or pull the headrest into the desired position. Such a system may eliminate the need for a driver and/or passenger to locate and physically depress a release button.

To determine whether a driver and/or passenger intends to adjust the vehicle headrest, sensors may monitor the movements of the driver and/or passengers. Sensors may also detect when the driver and/or passenger is touching the headrest. Based on collected sensor data, the system may detect movement, touch, or some other event that is consistent with a driver and/or passenger's intent to adjust the headrest. A processor may execute code to detect activity consistent with an intent to adjust the headrest. For example, an intent to adjust the headrest may be defined as a two-handed touch of the headrest or a two-handed gesture in the vicinity of the headrest. The processor may then execute code to confirm the intent to adjust. For example, if the detected touch or gesture consistent with intent to adjust is sustained for a threshold period of time, the processor may confirm an intent to adjust. Upon confirmation of the detected adjustment intent, the system may unlock one or more mechanical actuators that secure the headrest in place.

Unlocking the mechanical actuators may allow the driver and/or passengers to pull the headrest upwards and away from the seat, push headrest down and towards the seat, and/or tilt the headrest at an angle relative to the seat. Any type of appropriate locking mechanism may be used to lock the headrest in place.

Such a system may also be configured to determine not only that a user intends to adjust a vehicle headrest but also that it is a safe and appropriate time to adjust the headrest. For example, the processor may include instructions that instruct the system to keep the headrest locked while the vehicle is in motion. In another embodiment, the processor may be equipped with instructions to only unlock the vehicle headrest if a two-handed touch or gesture indicating intent to adjust the headrest is detected. Requiring a two-handed touch or gesture may eliminate the possibility that a driver has at least one hand on the wheel. Therefore, requiring a two-handed gesture may reduce and/or eliminate the possibility that a driver is attempting to adjust the headrest while driving because a driver would most likely need at least one hand on the wheel to operate the vehicle.

Sensor detection, as described, for example, in the preceding paragraph, may eliminate the need for a driver and/or passenger to locate and depress a physical release button. Eliminating the need to locate and depress a physical release button may improve vehicle headrest adjustment because, in conventional systems, the release button may be difficult to locate and depress. For example, if a headrest is lowered flush to the seat in a conventional system, the release button may be obscured between the headrest and the seat. The release button may difficult to locate because it may not be visible. Because the release button is trapped between the headrest and the seat, the release button may also be difficult to depress while simultaneously moving the headrest into the desired position.

For at least these reasons, a driver and/or passenger that does not need to locate or depress the release button may be more likely to adjust the vehicle headrest which may improve the safety and comfort of the driver and/or passenger. Additionally, drivers and/or passengers with disabilities, injuries, or other conditions affecting their ability to adjust the vehicle headrest may be better able to adjust the headrest properly in a system that does not require the driver/passenger to locate and depress a release button.

A headrest adjustment system may also include a power-assist function. The power-assist function may detect when a driver and/or passenger is manipulating the headrest. The power-assist function may, based on the actions of the driver and/or passenger in manipulating the headrest, provide power-assist to adjust the headrest in the manner attempted by the driver and/or passenger. Providing power-assist may reduce the force needed by the driver and/or passenger to adjust the vehicle headrest into the desired position. Therefore, a power-assist function may increase the chances that a driver and/or passenger will adjust the headrest because the power-assist function reduces the forces needed and offers an improved, intuitive approach. Additionally, a power-assist function may make it easier for drivers with differing physical strength, grip, reach, and other capabilities to adjust the headrest.

The systems and methods described above may be integrated into a new seat back/headrest system and may form a component of a new vehicle. However, in another embodiment, an existing seat back/headrest system in a vehicle may be retrofitting to include the features described above. For example, a vehicle may include an existing seatback/headrest system. Retrofitting the existing system may involve adding touch sensors and/or motion sensors to the existing headrest. Retrofitting may also involve replacing an existing lock/unlock mechanism with a smart mechatronic lock/unlock system. Retrofitting may further involve adding a wired or wireless connection to the sensors and smart mechatronic lock/unlocking system and existing or added vehicle circuitry. The retrofitted vehicle may also be equipped with instructions relating to detecting intent to adjust a vehicle and unlocking/locking the headrest, as described above. An existing vehicle may also be retrofitted with a power assist function. For example, an existing vehicle may be retrofitted to include a motor, force sensor, instructions and other components as described above with respect to the power assist function.

The systems and methods disclosed herein may be implemented with any of a number of different vehicles and vehicle types. For example, the systems and methods disclosed herein may be used with automobiles, trucks, recreational vehicles and other like on- or off-road vehicles that contain headrests. In addition, the principals disclosed herein may also extend to other vehicle types as well. For example, the systems and methods described herein can be implemented in many types of vehicle including hybrid electric vehicles (HEV), gasoline- or diesel-powered vehicles, fuel-cell vehicles, electric vehicles, or other vehicles. One of ordinary skill in the art reading this description will understand how the disclosed embodiments can be implemented with vehicle platforms.

FIG. 1 illustrates an example architecture for adjusting a vehicle headrest in accordance with embodiments of the systems and methods described herein. Referring now to FIG. 1, in this example, headrest adjustment system 100 includes a headrest control circuit 110, a plurality of sensors 122, and a plurality of vehicle systems 138. Sensors 120 and vehicle systems 130 can communicate with headrest control circuit 110 via a wired or wireless communication interface. Although sensors 120 and vehicle systems 130 are depicted as communicating with headrest control circuit 110, they can also communicate with each other as well as with other vehicle systems. Headrest control circuit 110 can be implemented as an electronic control unit (ECU) or as part of an ECU. In other embodiments, headrest control circuit 110 can be implemented independently of the ECU.

Headrest control circuit 110 in this example includes a communication circuit 101, a decision circuit 103 (including a processor 106 and memory 108 in this example) and a power supply 112. Components of headrest control circuit 110 are illustrated as communicating with each other via a data bus, although other communication in interfaces can be included. Headrest control circuit 110 in this example also includes a manual switch 105 that can be operated by the user to manually select the headrest adjustment mode.

Processor 106 can include a GPU, CPU, microprocessor, or any other suitable processing system. The memory 108 may include one or more various forms of memory or data storage (e.g., flash, RAM, etc.) that may be used to store the calibration parameters, images (analysis or historic), point parameters, instructions and variables for processor 106 as well as any other suitable information. Memory 108, can be made up of one or more modules of one or more different types of memory, and may be configured to store data and other information as well as operational instructions that may be used by the processor 106 and/or headrest control circuit 110.

Although the example of FIG. 1 is illustrated using processor and memory circuitry, as described below with reference to circuits disclosed herein, decision circuit 103 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a headrest control circuit 110.

Communication circuit 101 may include either or both a wireless transceiver circuit 102 with an associated antenna 114 and a wired I/O interface 104 with an associated hardwired data port (not illustrated). As this example illustrates, communications with headrest control circuit 110 can include either or both wired and wireless communications circuits 101. Wireless transceiver circuit 102 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 114 is coupled to wireless transceiver circuit 102 and is used by wireless transceiver circuit 102 to transmit radio signals wirelessly to wireless equipment with which it is connected and to receive radio signals as well. These RF signals can include information of almost any sort that is sent or received by headrest control circuit 110 to/from other entities such as sensors 120 and vehicle systems 130.

Wired I/O interface 104 can include a transmitter and a receiver (not shown) for hardwired communications with other devices. For example, wired I/O interface 104 can provide a hardwired interface to other components, including sensors 120 and vehicle systems 130. Wired I/O interface 104 can communicate with other devices using Ethernet or any of a number of other wired communication protocols whether standardized, proprietary, open, point-to-point, networked or otherwise.

Power supply 110 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 120 can include, for example, sensors that may or may not otherwise be included on a standard vehicle with which the headrest adjustment system 100 is implemented. In the illustrated example, sensors 120 include touch sensors 122, motion sensors 124, and cameras 126. Touch sensors 122 may include capacitive touch sensors. Touch sensors 122 may also include pressure sensors. Motion sensors 124 may include sensors that can detect gestures and other input associated with motion by a driver or passenger. Cameras 126 may also capture motion. Additional sensors 128 can also be included as may be appropriate for a given implementation of headrest adjustment system 100. For example, a force sensors may also be included. Other useful types of sensors may be included.

Vehicle systems 130 can include any of a number of different vehicle components or subsystems used to control or monitor various aspects of the vehicle and its performance. In this example, the vehicle systems 130 include an adjustment system 132 and a power-assist system 134. The adjustment system 132, may, for example, control a lock and release mechanism to adjust a headrest. The power-assist system 134, may, for example, control motors and other components associated with a power-assist function for use in adjusting a vehicle headrest. Additional vehicle systems 138 can also be included as may be appropriate for a given implementation of headrest adjustment system 100.

During operation, headrest control circuit 110 can receive information from various vehicle sensors to determine whether the headrest adjustment mode should be activated. Also, the driver may manually activate the headrest adjustment mode by operating adjustment switch 105. Communication circuit 101 can be used to transmit and receive information between headrest control circuit 110 and sensors 120, and headrest control circuit 110 and vehicle systems 130. Also, sensors 120 may communicate with vehicle systems 130 directly or indirectly (e.g., via communication circuit 101 or otherwise).

In various embodiments, communication circuit 101 can be configured to receive data and other information from sensors 120 that is used in determining whether to activate the adjustment mode. Additionally, communication circuit 101 can be used to send an activation signal or other activation information to various vehicle systems 130 as part of entering the adjustment mode. For example, as described in more detail below, communication circuit 101 can be used to send signals to, for example, adjustment system 132, which upon activation may release a headrest for adjustment or may lock a headrest into place after an adjustment period has ended or when it is no longer safe to adjust the headrest. Communication circuit 101 may also be used to send signals to power-assist system 134, upon, for example, activation of the system by a detected threshold force. Communication circuit 101 may also be used to send signals to any other vehicle system as may be appropriate to implement the systems and methods described herein. The decision regarding what action to take via these various vehicle systems 130 can be made based on the information detected by sensors 120. Examples of this are described in more detail below.

In an embodiment, communication circuit 101 may be used to send signals to vehicle systems 130 to indicate whether or not a vehicle is currently in use. For example, sensors 120 may directly detect that a vehicle is in use in a number of different ways. In one example, sensors 120 may include force sensors that detect acceleration of a vehicle. In another example, sensors may detect contact and/or pressure on the throttle pedal. Other examples exist. Processor 106 may include instructions that instruct adjustment system 132 to keep the headrest locked while the vehicle is in motion. Sensors 120 may also sense that vehicle movement has stopped. If sensors 120 detect that vehicle movement has stopped for a threshold period of time, processor 106 may instruct adjustment system 132 to unlock headrest and allow adjust, since the vehicle is currently not in motion.

Sensors may also indirectly determine that a vehicle is (not) in use. For example, touch 122, motion 124, or camera 126 sensors may detect a dual-handed touch or gestures by the driver, as described above in other embodiments. Detection of a two-handed touch or gesture may indicate that a driver does not have at least one hand on the wheel. Therefore, a two-handed touch or gesture may indicate that a driver is not attempting to adjust the headrest while driving because a driver would most likely need at least one hand on the wheel to operate the vehicle. A one-handed touch or gesture, may indicate the possibility that a driver is attempting to adjust the headrest while driving. The processor 106 may include instructions that instruct adjustment system 132 to unlock the vehicle headrest if a two-handed touch or gesture indicating intent to adjust the headrest is detected. The processor 106 may include instructions that instruct adjustment system 132 to keep the vehicle headrest locked if a one-handed touch or gesture is detected and/or if no touch or gesture is detected.

Figure 2:
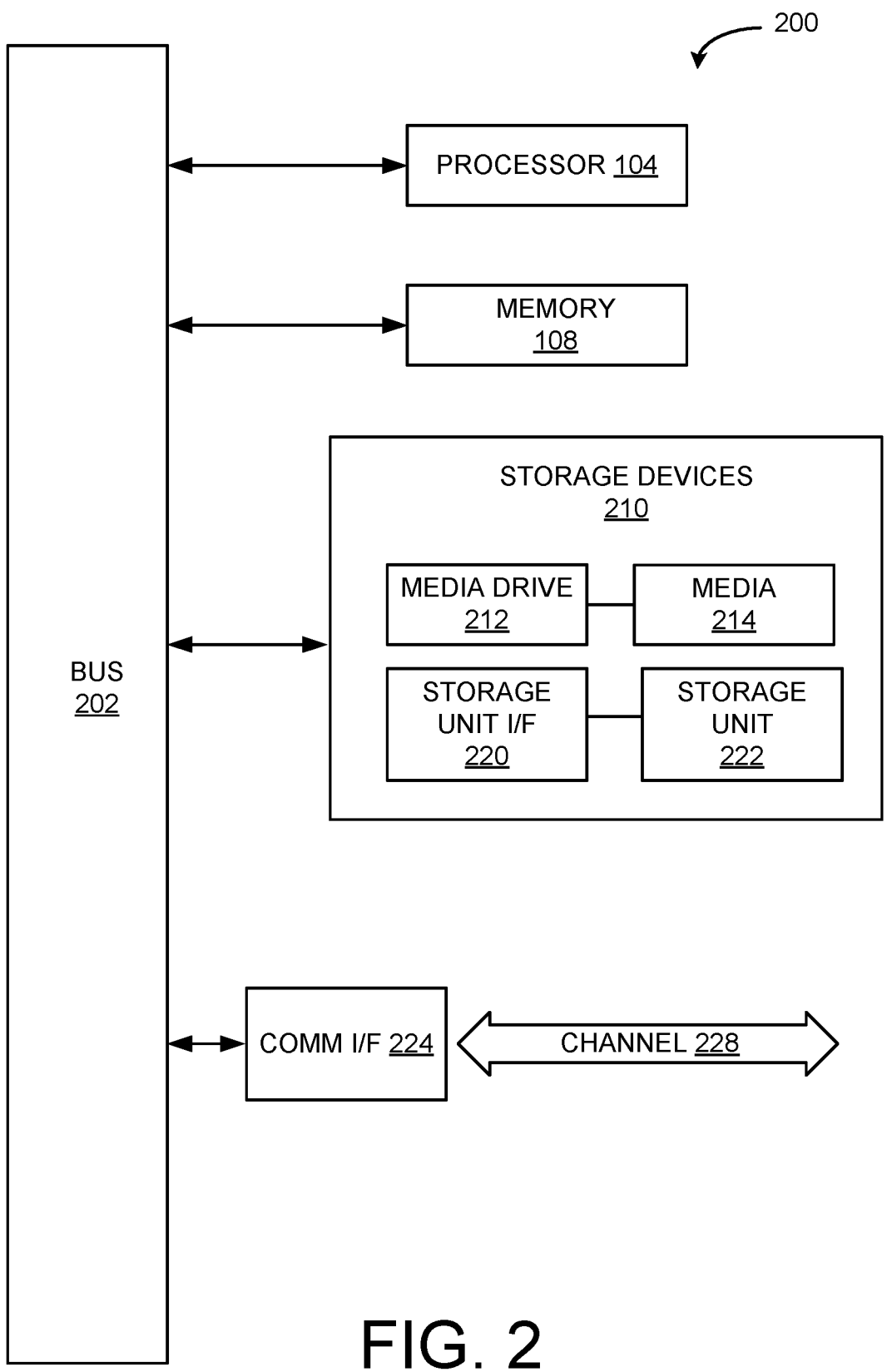
FIG. 2 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 2. Various embodiments are described in terms of this example-computing component 200. After reading this description, it will become apparent to a person skilled in the relevant art how to implement the application using other computing components or architectures.

Referring now to FIG. 2, computing component 200 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 200 might also represent computing capabilities embedded within or otherwise available to a given device. For example, a computing component might be found in other electronic devices such as, for example, portable computing devices, and other electronic devices that might include some form of processing capability.

Computing component 200 might include, for example, one or more processors, controllers, control components, or other processing devices. This can include a processor, and/or any one or more of the components making up user device, user system, and non-decrypting cloud service. Processor 106 might be implemented using a general-purpose or special-purpose processing engine such as, for example, a microprocessor, controller, or other control logic. Processor 106 may be connected to a bus 202. However, any communication medium can be used to facilitate interaction with other components of computing component 200 or to communicate externally.

Computing component 200 might also include one or more memory components, simply referred to herein as main memory 108. For example, random access memory (RAM) or other dynamic memory, might be used for storing information and instructions to be executed by processor 106. Main memory 108 might also be used for storing temporary variables or other intermediate information during execution of instructions to be executed by processor 106. Computing component 200 might likewise include a read only memory ("ROM") or other static storage device coupled to bus 202 for storing static information and instructions for processor 106.

The computing component 200 might also include one or more various forms of information storage mechanism 210, which might include, for example, a media drive 212 and a storage unit interface 220. The media drive 212 might include a drive or other mechanism to support fixed or removable storage media 214. For example, a hard disk drive, a solid-state drive, a magnetic tape drive, an optical drive, a compact disc (CD) or digital video disc (DVD) drive (R or RW), or other removable or fixed media drive might be provided. Storage media 214 might include, for example, a hard disk, an integrated circuit assembly, magnetic tape, cartridge, optical disk, a CD or DVD. Storage media 214 may be any other fixed or removable medium that is read by, written to or accessed by media drive 212. As these examples illustrate, the storage media 214 can include a computer usable storage medium having stored therein computer software or data.

In alternative embodiments, information storage mechanism 210 might include other similar instrumentalities for allowing computer programs or other instructions or data to be loaded into computing component 200. Such instrumentalities might include, for example, a fixed or removable storage unit 222 and an interface 220. Examples of such storage units 222 and interfaces 220 can include a program cartridge and cartridge interface, a removable memory (for example, a flash memory or other removable memory component) and memory slot. Other examples may include a PCMCIA slot and card, and other fixed or removable storage units 222 and interfaces 220 that allow software and data to be transferred from storage unit 222 to computing component 200.

Computing component 200 might also include a communications interface 224. Communications interface 224 might be used to allow software and data to be transferred between computing component 200 and external devices. Examples of communications interface 224 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 224 may be carried on signals, which can be electronic, electromagnetic (which includes optical) or other signals capable of being exchanged by a given communications interface 224. These signals might be provided to communications interface 224 via a channel 228. Channel 228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 108, storage unit 220, media 214, and channel 228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 200 to perform features or functions of the present application as discussed herein.

Embodiment 1

Figure 3:
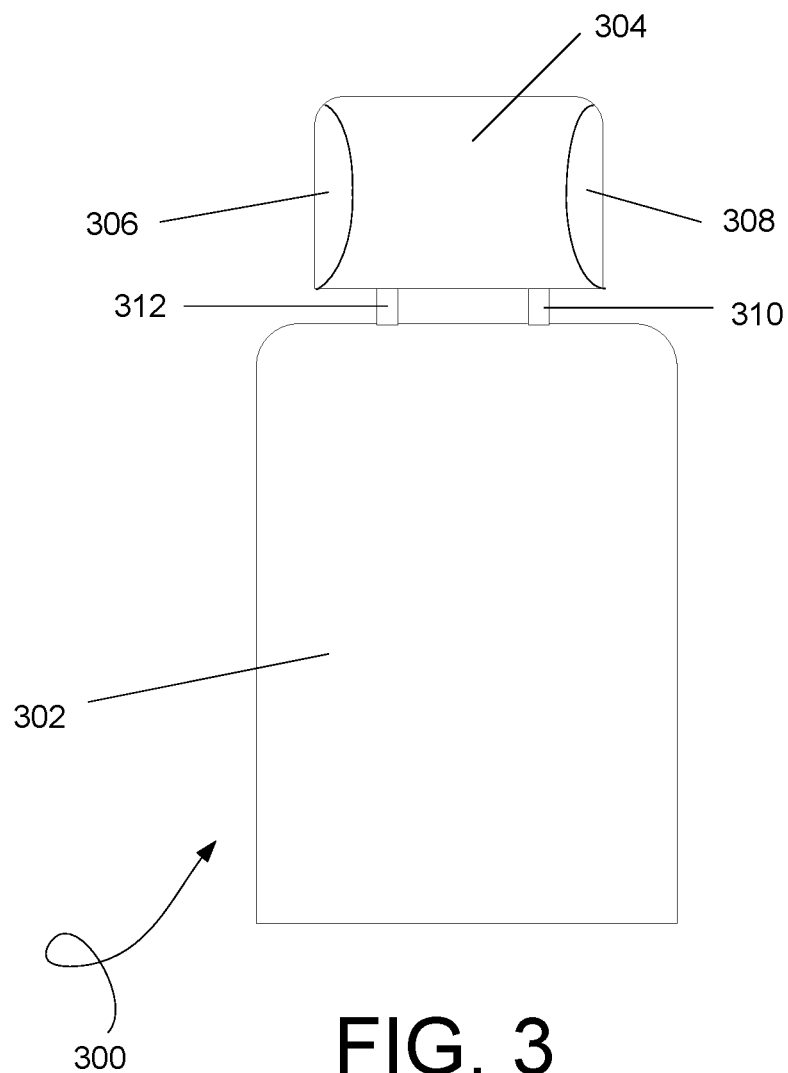
FIG. 3 is an example of a seatback/headrest system in accordance with one embodiment of the systems and methods described herein.
Figure 4A:
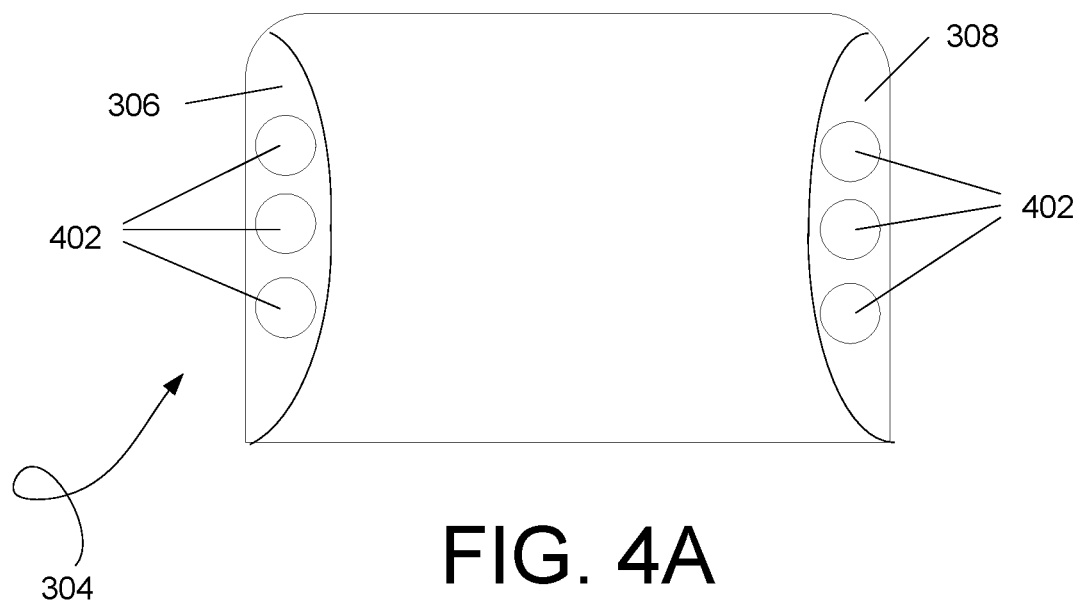
FIG. 4A is an example of a vehicle headrest adjustment system in accordance with one embodiment of the systems and methods described herein.

In one example embodiment of the systems and methods described herein, improved and intuitive headrest adjustment may be accomplished with a smart mechatronic lock-unlock interface that releases and/or secures a vehicle headrest based on detected user intent. Referring now to FIG. 3, an example of a seatback/head rest system 300 is shown. Referring now to FIG. 4A, an example of a vehicle headrest 304 adjustment system equipped with touch sensors 402 is shown.

FIG. 3 shows an example of a typical seat back/headrest system that may be present in a new vehicle or an existing vehicle. As shown in FIG. 3, a seatback/headrest system 300 may include a seatback 302 and a headrest 304. The headrest 304 may include a first portion 306 and a second portion 308. As shown in FIG. 3, the first portion 306 may be at the right side of the headrest 304 and the second portion 308 may be at the left side of the headrest 304. Other arrangements are possible. For instance, the first and second portions may be located at the top and bottom of the headrest or at any other areas of the headrest. The system 300 may also include rods 310, 312. The rods 310, 312 may be connected to the headrest 304. In an alternate embodiment, the rods 310, 312 may be connected to the seatback. The rods 310, 312 may slide into tracks (not shown). The tracks may be fitted into the seatback 302. The tracks may alternately be fitted into the headrest 304. The rods 310, 312 may be fitted into the tracks, connecting the seatback 302 to the headrest 304. The rods 310, 312 may be fitted into the tracks at various points which may result in the rods 310, 312 protruding from the tracks at various heights. The amount of protrusion may determine the position of the headrest 304 relative to the seatback 302 and the height of the headrest 304.

FIG. 4A shows an example of a vehicle headrest 304 adjustment system equipped with touch sensors 402. Touch sensors 402 may be located in both the first portion 306 and the second portion 308 of the vehicle headrest 304. To determine whether a driver and/or passenger intends to adjust the vehicle headrest 304, touch sensors 402 may detect when a driver and/or passengers touches a portion 306, 308 of the vehicle headrest 304. A vehicle headrest 304 may include touch-sensitive portions 306, 308 that can determine when a driver and/or passenger is touching one or more of the touch sensitive portions 306, 308 of the vehicle headrest 304. Touch sensitive portions 306, 308 of the vehicle headrest 304 may include touch sensors 402 configured on or within the vehicle headrest 304 itself. Touch sensors 402 may be, for example, capacitive touch sensors, pressure sensors, or any other type or combination of types of touch sensors.

Touch sensitive portions 306, 308 of a vehicle headrest 304 may be located, for example, on the left and right sides of the vehicle headrest 304. Touch sensitive portions 306, 308 may also be located on alternative areas of the vehicle headrest 304. The touch sensors 402 may be configured to detect touch by a driver and/or passenger that is consistent with intent to adjust the vehicle headrest 304. The touch sensors 402 may also be configured to detect touch by a driver and/or passenger that is both consistent with intent to adjust the vehicle headrest 304 and consistent with safe vehicle operation. For example, the touch sensors 402 may detect that a driver and/or passenger is touching both portions 306, 308, i.e., both the left 306 and the right 308 sides, of the vehicle headrest 304. Other portions of the vehicle headrest 304, beside or in addition to the left 306 and right 308 sides may also be touch sensitive portions. The sensors 310 may detect touch on other portions.

The sensors may be further configured to distinguish between one handed and dual-handed gripping of the headrest based on any configuration of touch sensitive portions. When the sensors determine that a driver and/or passengers is touching both portions of the vehicle headrest, the system may determine that the driver and/or passenger intends to adjust the vehicle headrest. When the sensors determine that a driver and/or passengers is touching both portions of the vehicle headrest, the system may determine both that the driver and/or passenger intends to adjust the vehicle headrest and that adjusting the headrest is consistent with safe vehicle operation. For example if a driver is attempting to adjust the headrest and the driver touches the headrest with both hands, the system may determine that the driver is not gripping the steering wheel with one or both hands. Because the driver is not touching the steering wheel, the system may determine the driver is not currently operating the vehicle and that it is safe to adjust the headrest now.

Touch sensors 402 may detect a touch that indicates a driver/passenger intends to adjust the headrest. Touch sensors 402 may be part of the sensors 120 described in FIG. 1. For instance, touch sensors 122 may include touch sensors 402. Upon detecting and confirming that a passenger and/or driver intends to adjust the vehicle headrest 304, the system 100 may unlock a lock(s) securing the headrest 304 in place. The processor 106 may, upon receiving information from sensors 120, confirm intent to adjust the headrest. The processor 106 may then send instruction to adjustment system 132 to unlock the headrest. The sensors 120, processor 106, and adjustment system 132 may communicate via a wired connection or wireless communication. For example, the adjustment system 132 may include wired or wireless controls for the smart mechatronic lock which unlocks or locks the headrest into place.

Unlocking the locks securing the headrest 304 in place may allow the driver and/or passenger to freely move the vehicle headrest 304 into the desired position. For example, in one embodiment, the headrest 304 may be attached to rods 310, 312. The rods 310, 312 may protrude from the bottom of the headrest 304. Unlocking the locks may allow the driver and/or passenger to pull the headrest 304 upward and away from the seat 302 to a desired height by pulling the headrest 304 and connected rods 310, 312. The rods 310, 312 may be configured into cylindrical tracks in the seat 302. Pulling the headrest 304 may cause the rods 310, 312 to move out of the tracks. Unlocking the locks may also allow the driver and/or passenger to push the headrest 304 downward and toward the seat 302 to a desired height by pushing the headrest 304 and thus causing the rods 310, 312 to move into the cylindrical tracks in the seat 302.

In another embodiment, the headrest 304 may be movably attached to the rods 310, 312. The rods 310, 312 may remain in place with the headrest moves. For example, unlocking the locks may allow a user to pull the headrest 304 along rods 310, 312 connecting the headrest 304 to the seat 302. Unlocking the locks may also allow the driver and/or passenger to push the headrest 304 downward and toward the seat 302 to a desired height by pushing the headrest 304 along the rods 310, 312 connecting the headrest 304 to the seat 302. Other configurations for adjusting the headrest and/or attaching the headrest to the seat are also possible. Unlocking the locks may also allow the driver and/or passenger to tilt the headrest 304 at an angle relative to the seat 302. In one embodiment, the system may only unlock locks securing the vehicle headrest 304 upon detecting and confirming both that a passenger and/or driver intends to adjust the vehicle headrest 304 and that adjusting the headrest 304 is consistent with safe operation of the vehicle.

Touch-sensitive portions 306, 308 of the vehicle headrest 304 may include any portions of the vehicle headrest. For example, touch sensitive portions 306, 308 may include the left 306 and right 308 sides of the headrest 304 as described above and as shown in FIG. 3. However, touch sensitive portions may also include any other portions of the vehicle headrest in addition to and/or alternative to the left and/or right sides of the vehicle headrest. In an example embodiment, a vehicle headrest may be equipped with touch sensitive portions that are configured to detect when the driver and/or passenger touches the headrest using both hands. The system may unlock the headrest only upon detection and confirmation of detected touch consistent with a dual-handed touch.

Requiring a dual-handed touch may offer several advantages. For example, requiring a dual-handed touch may prevent false positives. For example, a driver may accidently touch the vehicle headrest while stretching or passing an item to a child in the back seat. If the system were configured to detect only a single touch, the headrest may unlock inadvertently and potentially in a situation in which unlocking the headrest is dangerous, i.e., while the driver is operating the vehicle. Requiring a dual-handed touch may eliminate or reduce the likelihood of a false positive.

Additionally, a driver may be tempted to reach up to adjust the headrest with one hand while driving with the other hand on the steering wheel. It may be dangerous for the system to release the headrest in this scenario as the headrest would be loose while the driver is operating the vehicle. Requiring a touch with both hands on the headrest to unlock the headrest may reduce the likelihood of a driver attempting to adjust the headrest while operating the vehicle. Adjusting the headrest with both hands means both hands must be on the headrest and the driver cannot be simultaneously touching the headrest and the steering wheel. This eliminates or reduces the possibility that a driver will attempt to adjust the headrest while operating the vehicle, since a driver would likely need to keep at least one hand on the steering wheel to operate the vehicle.

A headrest adjustment system may include any type of touch sensors 402. For example, the sensors may be capacitive touch sensors. Capacitive touch sensors may not require the driver and/or passenger to exert any pressure and/or force onto the headrest. Capacitive touch sensors may detect a touch by determining the driver and/or passenger's hand or hands are in proximity with the touch-sensitive portions of the vehicle headrest. In another example, the sensors may be pressure sensors. Pressure sensors may detect and confirm that a driver and/or passenger is touching a touch sensitive portion of the vehicle headrest by measuring the pressure and/or force exerted by the driver and/or passenger in gripping the headrest and by confirming a touch when the measured pressure and/or force exceeds a threshold value. A system may include combinations of different types of sensors as well. For example, a system may include a combination of both capacitive touch sensors and pressure sensors. A system may additionally and/or alternatively include any other appropriate type of sensor. For example, a system may include heat sensors or other types of sensors that can detect touch.

After a driver and/or passenger has adjusted the vehicle headrest, the system may re-lock the headrest back into place. The processor 106 may instruct the adjustment system 132 to relock the headrest after a set period of time has expired. For example, the average time it takes to adjust a vehicle headrest may be a period of time, X. The system may automatically re-lock the headrest into place after the period of time, X, has expired after releasing the headrest, or after some other set period of time has expired. Additionally, and or alternatively, the sensors may determine that the hands of the driver and/or passenger are no longer contacting the vehicle headrest. The system may re-lock the headrest into place immediately upon determining that the hands of the driver and/or passenger are no longer contacting the headrest. Alternatively, the system may re-lock the headrest into place after determining both that the hands of the driver and/or passenger are no longer contacting the headrest and after a set period of time following the detected lack of contact with the headrest has elapsed.

In an alternative embodiment, vehicle movement may be detected directly using sensors 120 and may be used to determine whether or not the system may unlock the headrest 304 for adjustment. For example, sensors 120 may directly detect that a vehicle is in use in a number of different ways. In one example, sensors 120 may include force sensors that detect acceleration of a vehicle. In another example, sensors may detect contact and/or pressure on the throttle pedal. Other examples exist. If movement of a vehicle is detected by sensors 120, the processor 106 may instruct adjustment system 132 to keep the headrest locked, since it is not safe to adjust the headrest while the vehicle is in motion.

Sensors 120 may also sense that vehicle movement has stopped. If sensors 120 detect that vehicle movement has stopped for a threshold period of time, processor 106 may instruct adjustment system 132 to unlock headrest and allow adjustment. Since the vehicle is currently not in motion, the driver is likely not driving the vehicle and may safely adjust the headrest.

The systems and methods described above may be integrated into a new seat back/headrest system and may form a component of a new vehicle. However, in another embodiment, an existing seat back/headrest system in a vehicle may be retrofitting to include the features described above. For example, a vehicle may include an existing seatback/headrest system, similar to the system 300 shown in FIG. 3. Retrofitting the existing system may involve adding touch sensors to and/or embedding touch sensors into the existing headrest. Retrofitting may also involve replacing an existing lock/unlock mechanism with a smart mechatronic lock/unlock system. Retrofitting may further involve adding a wired or wireless connection to the sensors and smart mechatronic lock/unlocking system and existing or added vehicle circuitry. For instance, an existing vehicle ECU may be updated with instructions for operating the lock/unlock system where appropriate. The retrofitted vehicle may also be equipped with instructions relating to detecting intent to adjust a vehicle and unlocking/locking the headrest, as described in the foregoing paragraphs.

Embodiment 2

Figure 4B:
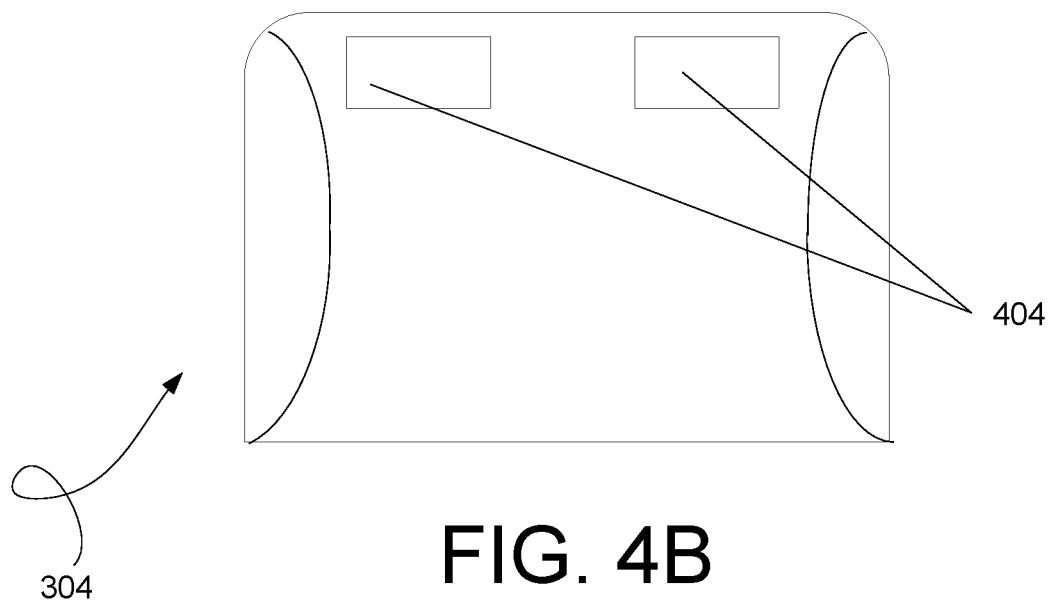
FIG. 4B is an example of a vehicle headrest adjustment system in accordance with one embodiment of the systems and methods described herein.

In one example embodiment of the systems and methods described herein, improved and intuitive headrest adjustment may be accomplished with a smart mechatronic lock-unlock interface that releases and/or secures a vehicle headrest based on detected user intent. Referring now to FIG. 3, an example of a seat back/headrest system 300 is shown. Referring now to FIG. 4B, an example of a vehicle headrest 304 adjustment system equipped with motion sensors 404 is shown.

For example, to determine whether a driver and/or passenger intends to adjust the vehicle headrest 304, monitoring sensors may detect when a driver and/or passengers performs a gesture consistent with adjusting the vehicle headrest 304. A vehicle headrest 304 may include motion sensors 404 configured on or within the vehicle headrest 304 itself. Motion sensors 404 may include, for example, camera sensors, sonar, radar, LIDAR, and additionally or alternatively any other appropriate motion sensor. The system may include any type or combinations of types of motion sensors. Motion sensors 404 may be located in any part of the vehicle headrest 304 itself and/or on some other part of the vehicle.

The motion sensors 404 may be configured to detect a hand gesture performed by the driver and/or passenger that is consistent with intent to adjust the vehicle headrest 304. For example, a hand gesture consistent with intent to adjust the vehicle headrest may a hand gesture that is naturally associate with adjusting a vehicle headrest. For example, when a driver and/or passenger intends to adjust the vehicle headrest, the driver and/or passenger may reach toward the vehicle headrest with both hands. Reaching toward the headrest with both hands may be detected by the motion sensors as a gesture consistent with adjust the vehicle headrest. Other natural hand gestures consistent with adjust the vehicle headrest may also be detected by the motion sensors. A hand gesture may also be a pre-set hand gesture that the driver and/or passenger knows in advance signifies that the driver and/or passenger intends to adjust the vehicle headrest. For example, the system may contain instructions that a "thumbs up" gesture signifies the driver and/or passenger intends to adjust the vehicle headrest. The driver and/or passenger may perform a "thumbs up" gesture when the driver and/or passenger intends to adjust the vehicle headrest. The motion sensors may detect the "thumbs up" gesture and may determine that the driver and/or passenger intends to adjust the vehicle headrest. Other pre-set hand gestures, such as waving, or any other appropriate gesture, may also signify that the driver and/or passenger intends to adjust the vehicle headrest.

The motion sensors 404 may also be configured to detect a hand gesture by a driver and/or passenger that is both consistent with intent to adjust the vehicle headrest 304 and consistent with safe vehicle operation. For example, the motion sensors 404 may detect that a driver and/or passenger is reaching out towards the vehicle headrest with both hands. Alternatively, the motions sensors 404 may detect that the driver and/or passenger is performing a double "thumbs up" gesture, i.e., the driver and/or passenger is gesturing with both hands, each hand forming a "thumbs up" gesture.

The sensors may be further configured to distinguish between one handed and dual-handed gestures based on any configuration and/or combination of motion sensors. When the sensors determine that a driver and/or passengers is performing a dual-handed gesture, the system may determine that the driver and/or passenger intends to adjust the vehicle headrest. When the sensors determine that a driver and/or passengers is performing a dual-handed gesture, the system may determine both that the driver and/or passenger intends to adjust the vehicle headrest and that adjusting the headrest is consistent with safe vehicle operation. For example if a driver is attempting to adjust the headrest and the driver performs a dual-handed gesture, the system may determine that the driver is not gripping the steering wheel with one or both hands. Because the driver is not touching the steering wheel, the system may determine the driver is not currently operating the vehicle and that it is safe to adjust the headrest now.

Motion sensors 404 may detect a gesture that indicates a driver/passenger intends to adjust the headrest. Motion sensors 404 may be part of the sensors 120 described in FIG. 1. For instance, motion sensors 124 and/or camera sensors 126 may include motion sensors 404. Upon detecting and confirming that a passenger and/or driver intends to adjust the vehicle headrest 304, the system 100 may unlock locks securing the headrest 304 in place. The processor 106 may, upon receiving information from sensors 120, confirm intent to adjust the headrest. The processor 106 may then send instruction to adjustment system 132 to unlock the headrest. The sensors 120, processor 106, and adjustment system 132 may communicate via a wired connection or wireless communication. For example, the adjustment system 132 may include wired or wireless controls for the smart mechatronic lock which unlocks or locks the headrest into place.

Unlocking the locks securing the headrest 304 in place may allow the driver and/or passenger to freely move the vehicle headrest 304 into the desired position. For example, unlocking the locks may allow the driver and/or passenger to pull the headrest 304 upward and away from the seat 302 to a desired height by pulling the headrest 304 along rods 310, 312 connecting the headrest 304 to the seat 302. Unlocking the locks may also allow the driver and/or passenger to push the headrest 304 downward and toward the seat 302 to a desired height by pushing the headrest 304 along the rods 310, 312 connecting the headrest 304 to the seat 302. Unlocking the locks may also allow the driver and/or passenger to tilt the headrest 304 at an angle relative to the seat 302. In one embodiment, the system may only unlock locks securing the vehicle headrest 304 upon detecting and confirming both that a passenger and/or driver intends to adjust the vehicle headrest 304 and that adjusting the headrest 304 is consistent with safe operation of the vehicle.

In an example embodiment, a vehicle headrest may be equipped with motion sensors that are configured to detect when the driver and/or passenger performs a dual-handed gesture indicating the driver and/or passenger intends to adjust the headrest. The system may unlock the headrest only upon detection and confirmation of a detected dual-handed gesture.

Requiring a dual-handed gesture may offer several advantages. For example, requiring a dual-handed gesture may prevent false positives. For example, a driver may accidently perform a gesture consistent with intent to adjust the vehicle headrest, such as a "thumbs up" while communicating with a passenger in the vehicle. If the system were configured to detect only a single-handed gesture, the headrest may unlock inadvertently and potentially in a situation in which unlocking the headrest is dangerous, i.e., while the driver is operating the vehicle. Requiring a dual-handed gesture may eliminate or reduce the likelihood of a false positive.

Additionally, a driver may be tempted to adjust the headrest with one hand while driving with the other hand on the steering wheel. It may be dangerous for the system to release the headrest in this scenario as the headrest would be loose while the driver is operating the vehicle. Requiring a dual-handed gesture to unlock the headrest may reduce the likelihood of a driver attempting to adjust the headrest while operating the vehicle. Performing a dual-handed gesture means both hands must be performing the gesture and the driver cannot be simultaneously performing the gesture and touching the steering wheel. This eliminates or reduces the possibility that a driver will attempt to adjust the headrest while operating the vehicle, since a driver would likely need to keep at least one hand on the steering wheel to operate the vehicle.

After a driver and/or passenger has adjusted the vehicle headrest, the system may re-lock the headrest back into place. The processor 106 may instruct the adjustment system 132 to relock the headrest after a set period of time has expired. For example, the average time it takes to adjust a vehicle headrest may be a period of time, X. The system may automatically re-lock the headrest into place after the period of time, X, has expired after releasing the headrest, or after some other set period of time has expired. Additionally, and or alternatively, the sensors may determine that the driver and/or passenger is no longer adjusting the headrest and/or performing gestures consistent with adjust the headrest. The system may re-lock the headrest into place immediately upon determining that the driver and/or passenger is no longer adjusting the headrest. The motion sensors may also detect a hand gesture that indicates the driver and/or passenger has completed adjusting the headrest. The completion gesture may be the same as the intent to adjust gesture or it may be a different gesture. The system may re-lock the headrest into place immediately upon determining that the driver and/or passenger has performed the completion gesture. Alternatively, the system may re-lock the headrest into place after determining either that the passenger and/or driver is no longer adjusting the headrest or that the driver and/or passenger has performed a completion gesture and after a set period of time following the detected lack of adjustment or detected completion gesture has elapsed.

In an alternative embodiment, vehicle movement may be detected directly using sensors 120 and may be used to determine whether or not the system may unlock the headrest 304 for adjustment. For example, sensors 120 may directly detect that a vehicle is in use in a number of different ways. In one example, sensors 120 may include force sensors that detect acceleration of a vehicle. In another example, sensors may detect contact and/or pressure on the throttle pedal. Other examples exist. If movement of a vehicle is detected by sensors 120, the processor 106 may instruct adjustment system 132 to keep the headrest locked, since it is not safe to adjust the headrest while the vehicle is in motion.

Sensors 120 may also sense that vehicle movement has stopped. If sensors 120 detect that vehicle movement has stopped for a threshold period of time, processor 106 may instruct adjustment system 132 to unlock headrest and allow adjustment. Since the vehicle is currently not in motion, the driver is likely not driving the vehicle and may safely adjust the headrest.

The systems and methods described above may be integrated into a new seat back/headrest system and may form a component of a new vehicle. However, in another embodiment, an existing seat back/headrest system in a vehicle may be retrofitting to include the features described above. For example, a vehicle may include an existing seatback/head rest system, similar to the system 300 shown in FIG. 3. Retrofitting the existing system may involve adding motion sensors to the existing headrest. Retrofitting may also involve replacing an existing lock/unlock mechanism with a smart mechatronic lock/unlock system. Retrofitting may further involve adding a wired or wireless connection to the sensors and smart mechatronic lock/unlocking system and existing or added vehicle circuitry. For instance, an existing vehicle ECU may be updated with instructions for operating the lock/unlock system where appropriate. The retrofitted vehicle may also be equipped with instructions relating to detecting intent to adjust a vehicle and unlocking/locking the headrest, as described in the foregoing paragraphs.

Embodiment 3

In one example embodiment of the systems and methods described herein, improved and intuitive headrest adjustment may be accomplished with a power-assist function that assists a driver and/or passenger in moving a vehicle headrest into a desired position. Referring now to FIGS. 6A and 6B, example of a power-assist system 500 are shown. A power-assist system 500 may include electric motors 520 that may assist the driver and/or passenger in moving the vehicle headrest 504. The power-assist system 500 may also include force sensors 530 located within the vehicle headrest 504 itself. The force sensors 530 may measure force applied to a vehicle headrest 504 by a driver and/or passenger.

In one embodiment, force sensors 530 may measure the force applied by a driver and/or passenger when the driver and/or passenger is attempting to move the vehicle headrest 504 in a vertical direction. The force sensors 530 may determine both that a driver and/or passenger is exerting a force on the headrest 504 an that the driver and/or passenger is applying a force in a selected direction. The system 500 may determine that when a driver and/or passenger applies a force on the headrest 504 in a selected direction, the driver and/or passenger intends to move the headrest 504 in the selected direction. When the force sensors 530 detect that a driver and/or passenger is attempting to move the vehicle headrest 504 in a selected direction, the power-assist system 500 may actuate electric motors 520. The electric motors 520 may move the vehicle headrest 504 in the selected direction.

Force sensors 530 may detect a force that indicates a driver/passenger intends to move the headrest in a selected direction. Force sensors 530 may be part of the sensors 120 described in FIG. 1. Upon detecting and confirming that a passenger/driver intends to adjust the headrest 304 in a selected direction, the system 100 may activate a power assist function. The processor 106, upon receiving information from the sensors 120, may confirm intent to adjust the headrest in a selected direction. The processor 106 may then send instructions to the power assist system 134 to move the headrest in the selected direction. The sensors 120, processor 106, and power assist system 134 may communicate via a wired connection or wireless communication. For example, the power assist system 134 may include wired or wireless controls for the motors 520 which move the headrest into place.

Figures 5A, 5B:
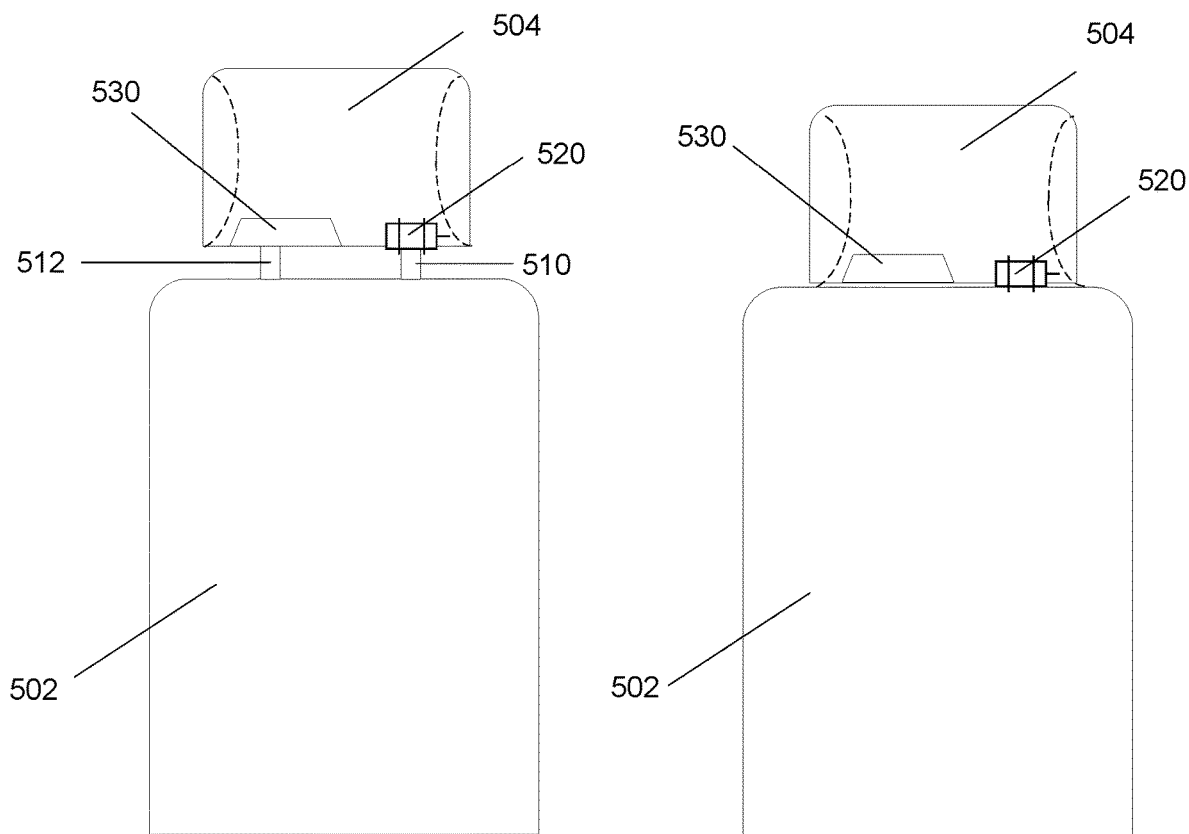
FIG. 5A is an example of a power-assist headrest adjustment system in accordance with one embodiment of the systems and methods described herein.
FIG. 5B is an example of a power-assist headrest adjustment system in accordance with one embodiment of the systems and methods described herein.

For example, a driver may intend to adjust a vehicle headrest 504 as shown in FIG. 5A. The driver may push down on the vehicle headrest 504. The force sensors 530 may determine that the driver is exerting a force on the vehicle headrest 504. The system 500 may then determine that the driver intends to move the vehicle headrest. The force sensors 530 may further determine that the driver is exerting a downward force on the vehicle headrest 504. The system 500 may then determine that the driver intends to move the vehicle headrest 504 downward and toward the seat 502. The system 500 may then actuate electric motors 520 to perform the downward movement. The electric motors 520 may move the headrest 504 downward toward the seat 502 by moving the headrest 504 downward along rods 510, 512 connecting the headrest 504 to the seat 502. After the motors 520 have moved the headrest downward, the headrest may occupy a position as shown in FIG. 5B.

In another example, a driver may push up on the vehicle headrest 504. The force sensors 530 may detect this upward force and the system 500 may actuate the electric motors 520 to move the headrest 504 in an upward direction. When a driver is finished adjusting the headrest into the desired position, the driver may stop applying a force to the headrest. The force sensors 530 may detect that the driver is no longer applying a force to the headrest. The system 500 may determine that the driver is finished adjusting the headrest. The system 500 may stop the electric motors 520 to stop moving the headrest 504.

The force sensors 530 may also detect a counter-force. For example, the driver may push upwards on the headrest, indicating that the driver wished to move the headrest upwards. The system may actuate the motors 520 which may move the headrest upward in the direction indicated by the driver. Once the headrest reaches the position desired by the driver, the driver may push the headrest downward, pull the headrest downward, or hold the headrest in place, counteracting the upward motion of the headrest. The force sensor may detect this counter-force applied by the driver. The system 500 may determine that the driver is finished adjusting the headrest. The system 500 may stop the motors 520 to stop moving the headrest 504.

Additionally, the system 500 may configured to automatically stop moving the headrest when the headrest has reached a certain position. For example, the system may be configured to automatically stop moving the headrest downward when the headrest reaches a position where it is contacting the seat 502, as shown in FIG. 5B. In another example, the system may be configured to automatically stop moving the headrest upward when further upward movement would cause the headrest 504 to come loose from the rods 510, 512 connecting the headrest to the seat 502. The system may also be configured to automatically stop moving the headrest in other positions. For example, a driver and/or passenger may save a pre-set desired headrest position. The system may automatically stop adjusting the headrest when it reaches a desired pre-set headrest position. Other configurations are also possible.

In an alternative embodiment, vehicle movement may be detected directly using sensors 120 and may be used to determine whether or not the system may unlock the headrest 304 for adjustment. For example, sensors 120 may directly detect that a vehicle is in use in a number of different ways. In one example, sensors 120 may include force sensors that detect acceleration of a vehicle. In another example, sensors may detect contact and/or pressure on the throttle pedal. Other examples exist. If movement of a vehicle is detected by sensors 120, the processor 106 may instruct adjustment system 132 to keep the headrest locked, since it is not safe to adjust the headrest while the vehicle is in motion.

Sensors 120 may also sense that vehicle movement has stopped. If sensors 120 detect that vehicle movement has stopped for a threshold period of time, processor 106 may instruct adjustment system 132 to unlock headrest and allow adjustment. Since the vehicle is currently not in motion, the driver is likely not driving the vehicle and may safely adjust the headrest.

The systems and methods described above may be integrated into a new seat back/headrest system and may form a component of a new vehicle. However, in another embodiment, an existing seat back/headrest system in a vehicle may be retrofitting to include the features described above. For example, a vehicle may include an existing seatback/headrest system, similar to the system 300 shown in FIG. 3. Retrofitting the existing system may involve adding force sensors and motors to the headrest. Retrofitting may further involve adding a wired or wireless connection to the force sensors and motor and existing or added vehicle circuitry. For instance, an existing vehicle ECU may be updated with instructions for operating the power assist function where appropriate. The retrofitted vehicle may also be equipped with instructions relating to detecting a force applied to a headrest in a direction for a threshold period, as described in the foregoing paragraphs. The instructions may further relate to moving the headrest with the motor in the direction of the detected force.

Embodiment 3, the power assist-function may be combined with embodiment 1, the touch sensor headrest adjustment system and/or embodiment 2, the motion sensor headrest adjustment system. Though each of these embodiments are described separately, the descriptions are in no way intended to limit application of any of the embodiment described herein. Embodiments may be performed independently or may be combined in any matter. For instance, embodiments 1 and 3 may be combined in a system leveraging touch sensors to determine a driver and/or passenger wishes to adjust a headrest and a power-assist function to assist the driver and/or passenger in moving the headrest into the desired position. As another example, embodiments 2 and 3 may be combined in a system leveraging motion sensors to determine a driver and/or passenger wishes to adjust a headrest and a power-assist function to assist the driver and/or passenger in moving the headrest into the desired position. As another example, embodiments 1 and 2 may be combined in a system leveraging both touch and force sensors to determine a driver and/or passenger wished to adjust a headrest. Such system may, optionally, further include the power-assist function of embodiment 3 to facilitate adjustment of the headrest.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A headrest adjustment system comprising:
a touch sensor system, wherein touch sensors are embedded in first and second portions of a headrest such that the touch sensor system is configured to detect a user touch at both the first portion and the second portion of the headrest; and
a smart lock mechanism to secure the headrest in place, wherein, upon detection of a user touch at both the first portion and the second portion of the headrest, the system unlocks the smart lock mechanism, releasing the headrest.

2. The system of claim 1, wherein the touch sensor system comprises capacitive touch sensors configured to detect user touch at both the first portion and the second portion of the headrest.

3. The system of claim 1, wherein the touch sensor system comprises pressure sensors configured to detect user touch at both the first portion and the second portion of the headrest.

4. The system of claim 1 wherein, upon detection of a lack of user touch at both the first portion and the second portion of the headrest, the system locks the smart lock mechanism, securing the headrest in place.

5. The system of claim 1 wherein, upon the expiration of a set period of time following release of the headrest, the system locks the smart lock mechanism, securing the headrest in place.

6. The system of claim 1 wherein, upon the expiration of a set period of time following detection of a lack of user touch at both the first portion and the second portion of the headrest, the system locks the smart lock mechanism, securing the headrest in place.

7. The system of claim 1 wherein the first portion of the headrest and the second portion of the headrest are selected such that in order for a user to touch both the first portion of the headrest and the second portion of the headrest, the user must touch the headrest with two hands.

8. The system of claim 1 further comprising:
a motion sensor system, the motion sensor system configured to detect hand gestures indicating a user intends to adjust the headrest, wherein, the smart lock mechanism is further configured to communicate with the motion sensor system such that, upon detection of hand gestures indicating the user intends to adjust the headrest, the system unlocks the smart lock mechanism, releasing the headrest.

9. A headrest adjustment method comprising:
detecting, using touch sensors, a simultaneous first user touch at a first portion of the headrest and a second user touch at a second portion of the headrest;
confirming the detected first and second user touches indicate that the user intends to adjust the headrest;
unlocking a smart mechatronic lock, the smart mechatronic lock securing the headrest in place, to enable free movement of the headrest;
detecting, using force sensors, a user force applied to the headrest; and
moving the headrest, using motors, in the direction indicated by the applied user force.

10. The method of claim 9 further comprising:
detecting, using force sensors, the absence of a user force applied to the headrest;
stopping motion of the headrest;
detecting, using touch sensors, the absence of a user touch at both the first and second portions of the headrest;
confirming the detected absence of user touches indicates the user is finished adjusting the headrest; and
locking the smart mechatronic lock to secure the headrest in place.

11. The method of claim 9 further comprising:
confirming that the detected user hand gesture is consistent with safe operation of a vehicle.

* * * * *